(12) United States Patent
Aeo et al.

(10) Patent No.: US 10,466,540 B2
(45) Date of Patent: Nov. 5, 2019

(54) DISPLAY DEVICE WITH BOTTOM COVER GLASS

(71) Applicant: LG Display Co., Ltd., Seoul (KR)

(72) Inventors: JongTak Aeo, Paju-si (KR); SangMo Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 67 days.

(21) Appl. No.: 15/795,819

(22) Filed: Oct. 27, 2017

(65) Prior Publication Data

US 2018/0120644 A1    May 3, 2018

(30) Foreign Application Priority Data

Oct. 31, 2016 (KR) .................. 10-2016-0143814

(51) Int. Cl.
| | | |
|---|---|---|
| *G02F 1/1333* | (2006.01) | |
| *G02F 1/1335* | (2006.01) | |
| *G02F 1/13357* | (2006.01) | |
| *G02F 1/1345* | (2006.01) | |
| *G09G 3/3241* | (2016.01) | |

(Continued)

(52) U.S. Cl.
CPC ...... *G02F 1/133615* (2013.01); *G02F 1/1336* (2013.01); *G02F 1/133308* (2013.01); *G02B 6/0088* (2013.01); *G02B 6/0091* (2013.01); *G02B 6/0093* (2013.01); *G02F 1/13452* (2013.01); *G02F 2001/133314* (2013.01); *G02F 2001/133628* (2013.01); *G02F 2201/503* (2013.01); *G02F 2201/54* (2013.01); *G02F 2202/09* (2013.01); *G09G 3/3241* (2013.01);

(Continued)

(58) Field of Classification Search
CPC ....... G02B 6/0081–0093; G02F 2001/133314; G02F 1/133308; G02F 1/133615
See application file for complete search history.

(56) References Cited

U.S. PATENT DOCUMENTS

| | | | |
|---|---|---|---|
| 2010/0073959 A1* | 3/2010 | Hamada ............... | G02B 6/0085 362/611 |
| 2014/0092631 A1* | 4/2014 | Fujii ....................... | G09F 9/30 362/611 |

(Continued)

FOREIGN PATENT DOCUMENTS

| | | |
|---|---|---|
| CN | 201764409 U | 3/2011 |
| CN | 104094334 A | 10/2014 |

OTHER PUBLICATIONS

Extended European Search Report dated Apr. 5, 2018 from the European Patent Office in counterpart EP application No. 17199149.0.

(Continued)

*Primary Examiner* — Anh T Mai
*Assistant Examiner* — Steven Y Horikoshi
(74) *Attorney, Agent, or Firm* — Morgan, Lewis & Bockius LLP

(57) ABSTRACT

A display device is provided that includes a display panel, a light guide plate on a rear side of the display panel, a reflector on a rear surface of the light guide plate, a cover bottom on a rear surface of the reflector, wherein the cover bottom is made of a glass material, and a light-emitting diode (LED) housing including an LED on one end thereof to supply light to an end of the light guide plate, another end of the LED housing being coupled to a rear surface of an end of the cover bottom.

11 Claims, 7 Drawing Sheets

(51) Int. Cl.
    *G09G 3/36*     (2006.01)
    *F21V 8/00*     (2006.01)
(52) U.S. Cl.
    CPC ....... *G09G 3/3648* (2013.01); *G09G 2320/02* (2013.01)

(56) References Cited

U.S. PATENT DOCUMENTS

2015/0022889 A1    1/2015    Amano
2015/0293398 A1    10/2015   Song
2016/0018589 A1    1/2016    Ha et al.
2016/0192512 A1    6/2016    Fujii et al.

OTHER PUBLICATIONS

Office Action dated Jun. 17, 2019, from the Chinese Patent Office in counterpart Chinese application No. 201711036653.5. Note: US 2014/0092631 A1 cited therein is already of record.

* cited by examiner

DISPLAY DEVICE WITH BOTTOM COVER GLASS

CROSS REFERENCE TO RELATED APPLICATION

This application claims priority from Korean Patent Application No. 10-2016-0143814, filed on Oct. 31, 2016, which is hereby incorporated by reference for all purposes as if fully set forth herein.

BACKGROUND

1. Technical Field

Embodiments disclosed herein relate to a display device and, more particularly, to a display device that is capable of preventing being warped or broken due to heat generated during the driving thereof, thereby increasing consumer satisfaction with respect to the appearance of the display device, and increasing a screen immersion level while reducing the thickness thereof and the size of a bezel thereof compared with a conventional display device.

2. Description of the Related Art

In general, as flat panel display devices, a liquid crystal display device, a plasma display device, a field emission display device, an organic light-emitting display device, and the like have been actively researched. However, the liquid crystal display device and the organic light-emitting display device have been in the spotlight in recent years due to advantages in mass production technology, ease of driving means, and implementation of high image quality.

FIG. 1 is an exploded perspective view schematically illustrating the structure of a general liquid crystal display device.

As illustrated in FIG. 1, a general liquid crystal display device includes a liquid crystal panel 10 in which pixels are arranged in a matrix form so as to output an image, drivers 15 and 16 for driving the pixels, a backlight unit provided on the rear surface of the liquid crystal panel 10 to emit light over the entire surface of the liquid crystal panel 10, and a panel guide 45 that fixedly receives the liquid crystal panel 10 and the backlight unit.

The liquid crystal panel 10 includes a color filter substrate and an array substrate bonded together to maintain a uniform cell gap, and a liquid crystal layer formed in a cell gap between the color filter substrate and the array substrate.

A common electrode and a pixel electrode are formed on the liquid crystal panel 10 in which the color filter substrate and the array substrate are bonded to each other. The common electrode and the pixel electrode apply an electric field to the liquid crystal layer. When the voltage of a data signal applied to the pixel electrode is controlled in a state in which the voltage is applied to the common electrode, the liquid crystal of the liquid crystal layer rotates due to dielectric anisotropy according to the electric field between the common electrode and the pixel electrode, and light is transmitted through or blocked by each pixel to display a character or an image.

In addition, in order to control the voltage of the data signal applied to the pixel electrode for each pixel, a switching element, such as a thin film transistor (TFT), is individually provided in each pixel.

Upper and lower polarization plates (not illustrated) are attached to the outside of the liquid crystal panel 10. The lower polarization plate polarizes the light that passes through the backlight unit, and the upper polarization plate polarizes the light that passes through the liquid crystal panel 10.

With reference to the backlight unit, in more detail, a light-emitting diode (LED) assembly 30 for emitting light is provided on one side of a light guide plate 42, and a reflector 41 is provided on the rear surface of the light guide plate 42.

In this case, the LED assembly 30 includes an LED array 31 and an LED housing 32 to which an LED Printed Circuit Board (PCB) (not illustrated) that drives the LED array 31 is attached.

The light emitted from the LED array 31 is incident on the side surface of the transparent light guide plate 42 that is made of a transparent material, and the reflector 41 disposed on the rear surface of the light guide plate 42 guides the light transmitted through the back surface of the light guide plate 42 toward an optical sheet 43 on the top surface of the light guide plate 42 to reduce the loss of light and improve the uniformity of the light.

On the upper side of the backlight unit configured as described above, a liquid crystal panel 10 constituted with a color filter substrate and an array substrate is seated via a panel guide 45. The liquid crystal panel 10 and the panel guide 45 are coupled to the backlight unit by a cover bottom 50 and a case top 60 to constitute a liquid crystal display device.

However, the display device may have a problem in that the thickness thereof and the size of a bezel thereof are increased due to the cover bottom, which is formed of a metal, a plastic resin, or the like, so that consumers are not satisfied with the appearance of the display device, and the screen immersion level also deteriorates.

In addition, the display device may have a problem in that the entire display device is warped or broken due to heat generated from the backlight unit or the like.

In particular, when the front surface of the display panel is warped so as to become convex, the opposite ends of the display panel may fall outside of a person's viewing angle. As a result, the display device may a problem in that the appearance of the display device is not satisfactory to a consumer, whereby marketability deteriorates. The screen immersion level also deteriorates.

Accordingly, there is an increasing need for the development of a display device that is capable of preventing itself from being warped or broken due to heat generated during the driving thereof, thereby increasing consumer satisfaction with respect to the appearance of the display device, and increasing a screen immersion level while reducing the thickness thereof and the size of a bezel thereof.

SUMMARY

Accordingly, embodiments of the present disclosure are directed to a display device that substantially obviates one or more of the problems due to limitations and disadvantages of the related art.

In this background, an object of the embodiments is to provide a display device that is capable of reducing the thickness thereof and the size of a bezel thereof as compared with a related art cover bottom made of a metal or a plastic resin, thereby increasing the consumer satisfaction with respect to the appearance of the display device, increasing the marketability of the display device, and increasing a screen immersion level.

Another object of the embodiments is to provide a display device that is capable of preventing itself from being warped or broken by thermal expansion caused due to heat generated from a backlight unit or the like in the display device.

Additional features and aspects will be set forth in the description that follows, and in part will be apparent from the description, or may be learned by practice of the concepts provided herein. Other features and aspects of the concepts may be realized and attained by the structure particularly pointed out in the written description, or derivable therefrom, and the claims hereof as well as the appended drawings.

To achieve these and other aspects of the inventive concepts, as embodied and broadly described, a display device comprises a display panel; a light guide plate on a rear side of the display panel; a reflector on a rear surface of the light guide plate; a cover bottom on a rear surface of the reflector, wherein the cover bottom is made of a glass material; and a light-emitting diode (LED) housing including an LED on one end thereof to supply light to an end of the light guide plate, another end of the LED housing being coupled to a rear surface of an end of the cover bottom.

It is to be understood that both the foregoing general description and the following detailed description are example and explanatory and are intended to provide further explanation of the disclosure as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain the various principles. In the drawings.

DETAILED DESCRIPTION

Figure 1:
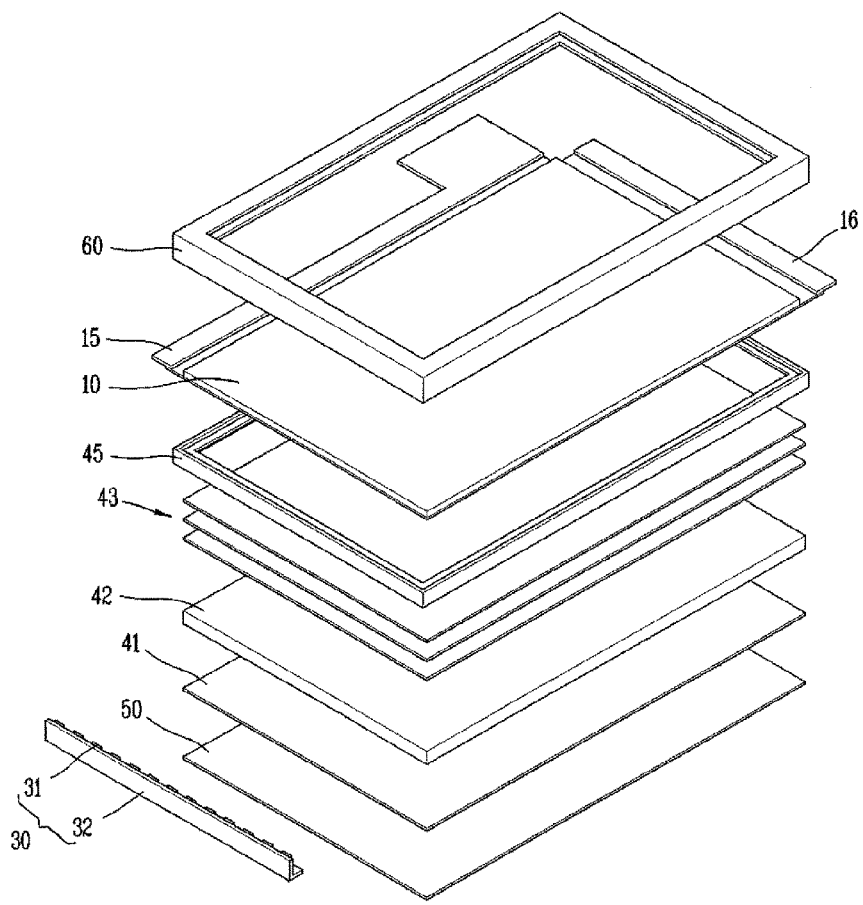
FIG. 1 is an exploded perspective view schematically illustrating the structure of a general liquid crystal display device.

Hereinafter, embodiments will be described with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

As illustrated in the figures, a display device according to the example embodiments includes a light guide plate 203 provided on the rear side of the display panel 200, a reflector 205 provided on the rear surface of the light guide plate 203, a cover bottom 230 provided on the rear surface of the reflector 205 and made of a glass material, and an LED housing 220, one end of which is mounted with several LEDs 211 configured to supply light to one end portion of the light guide plate 203 and the other end of which is coupled to a rear surface of one end portion of the cover bottom 230.

Figure 2:
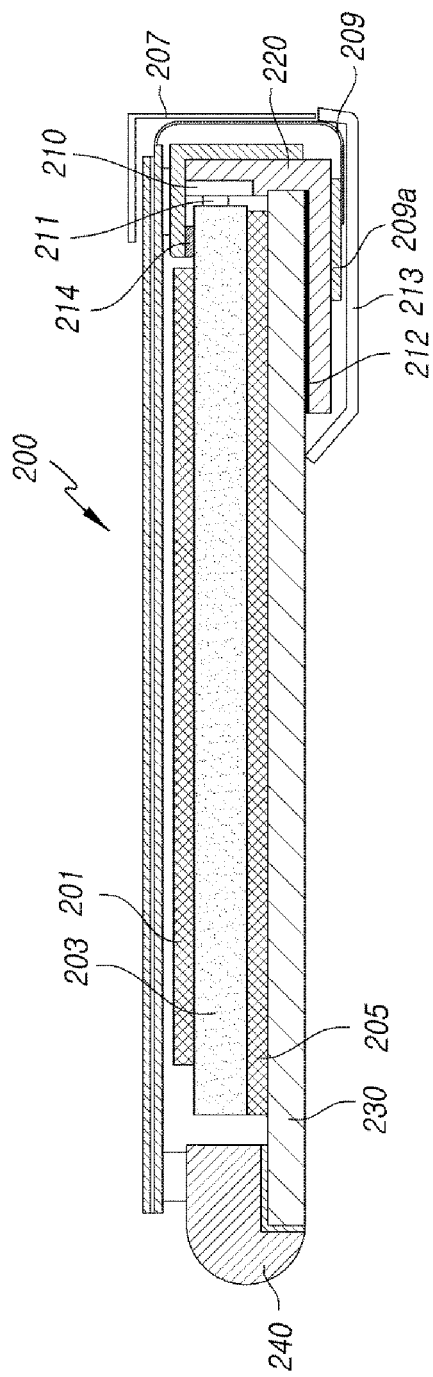
FIG. 2 is a cross-sectional view schematically illustrating an example display device according to embodiments disclosed herein.

First, with reference to FIG. 2, in the display device according to the example embodiments, the display panel 200, an optical sheet 201, and the like are disposed at the front side of the light guide plate 203, and the reflector 205, the cover bottom 230, and the like are disposed at the rear side of the light guide plate 203. At one end portion of the light guide plate 203, the LEDs 211, the LED Printed Circuit Board (PCB) 210, and the like are mounted, and a guide light or the like is provided outside the LED housing 220 and coupled to the LED housing 220 with an adhesive member 214.

In addition, various control unit PCBs configured to control the display panel 200 are bent toward and mounted on the rear side of the LED housing 220, and the case top 207 and the back cover 213 are coupled while enclosing the outer side of the LED housing 220.

The cover bottom 230 serves to support the display panel 200 and various components, and to complement the structural rigidity of the entire display device. In the embodiments, the cover bottom 230 may be made of a thin glass material.

Therefore, compared with a related art cover bottom made of a metal, a plastic resin, or the like, the thickness can be reduced, warpage and expansion can be greatly reduced, and marketability to consumers can be enhanced owing to the design merit of the glass itself.

Here, for convenience of description, example embodiments are described with reference to an example in which the display panel is a liquid crystal display panel. However, the embodiments may be equally applied regardless of whether the display panel is, e.g., either a liquid crystal display panel or an organic light-emitting display panel.

For example, the organic light-emitting display panel may include a lower substrate including a plurality of light-emitting cells formed in each region defined by a gate line, a data line, and a power source (VDD) line, and an upper substrate bonded to the lower substrate so as to be opposite the lower substrate.

Each of the plurality of light-emitting cells formed on the lower substrate may include at least one switching transistor connected to the gate line and the data line, at least one driving transistor connected to the switching transistor and the power supply (VDD) line, and an organic light-emitting element (e.g., an OLED) that emits light by a current controlled according to the switching of the driving transistor. The upper substrate may include a moisture absorbent or the like in order to protect the light-emitting element from moisture or oxygen in the air.

In this case, the upper substrate may further include an organic light-emitting element connected to the driving transistor. In this case, the light-emitting element of the lower substrate may be omitted.

In the case where the display panel 200 is an organic light-emitting display, a backlight unit that emits light to a panel is not configured due to the structure of the organic light-emitting display, which emits light by itself. In this case, thermal expansion is caused due to heat generated from the printed circuit board provided at the rear side of the display panel.

In the case in which the display panel 200 is a liquid crystal display panel, the display panel may include case members configured to assemble a backlight unit, a driving circuit unit, a liquid crystal display panel, a backlight unit, and the like into one module, and the driving circuit unit may include a control unit, such as a data driving circuit (source driving circuit), a gate driving circuit (scan driving circuit), a timing controller, and a printed circuit board.

Also, in the case of the liquid crystal display panel, a liquid crystal layer may exist between an upper substrate and a lower substrate, in which the upper substrate may be a color filter substrate corresponding to a viewing screen unit, and the lower substrate may be a thin film transistor substrate.

In addition, at any one end portion of the display panel 200 formed in a rectangular shape, a plurality of flexible circuit films 209, on which ICs are mounted, may be electrically connected to the display panel 200, and a PCB 209a is disposed to be parallel to the display panel 200.

In addition, the plurality of flexible circuit films 209 are attached to pad portions and the PCB 209a by, e.g., a Tape Automated Bonding (TAB) process, and may be formed of a Tape Carrier Package (TCP), or a Chip On Flexible board or Chip On Film (COF).

Accordingly, the display panel 200 may be electrically joined to or connected to a source PCB 209a through the plurality of flexible circuit films 209 and the source PCB 209a, which is enclosed and protected by the case top 207, and the back cover 213 may be electrically connected to the plurality of flexible circuit films 209 so as to provide various signals to a timing controller configured to display an image on the display panel 200.

In the case of the liquid crystal display panel, the backlight unit may include an LED 211, a light guide plate 203, and the like so as to supply light to the display panel 200, and may be implemented as a direct type, an edge type, or the like, depending on the mounting position of the LED 211.

Meanwhile, an LED housing 220 on which several LEDs 211 and an LED PCB 210 are mounted is coupled to the rear surface of the cover bottom 230 by an adhesive member 212 so that an end portion of the cover bottom 230, which is made of a glass material, is not cracked or broken to be scattered.

As the adhesive member 212, any adhesive material, such as a pad provided with adhesive layers on the opposite sides thereof, a double-sided tape, a resin, or other adhesive, may be used.

In addition, the LED housing 220 may be divided into two or more portions in the longitudinal direction from one end of the cover bottom 230 to the other end of the cover bottom 230 so that even if the LED housing 220 is thermally expanded, the cover bottom 230 is suppressed from being warped or broken.

The LED housing 220 may be formed of a metal material. In consideration of the appearance of the display device, as well as a predetermined level of strength, the LED housing 220 may be formed of aluminum, an aluminum alloy, stainless steel, a galvanized steel sheet, or the like.

The LED housing 220 may be expanded in the longitudinal direction from one end to the other end by the heat generated from the LEDs 211 and the LED PCB 210. Because the LED housing 220 is divided in the longitudinal direction, expansion force is reduced, and the expansion direction is canceled in the space between the divided portions, so that the total expansion amount of the LED housing 220 is reduced.

The thermal expansion of the LED housing 220 may act as an important factor in the bending and breakage of the cover bottom 230, which is formed of a glass material. Because the expansion amount of the glass material may be extremely small, bending force may be applied to the cover bottom 230 by the LED housing 220, which has a relatively large coefficient of thermal expansion.

Accordingly, because the LED housing 220 is divided in the longitudinal direction and the expansion amount of each of the divided LED housing portions is reduced so as to reduce the bending force that is applied to the cover bottom 230, it may be possible to prevent breakage of the cover bottom 230 due to bending.

Figure 3:
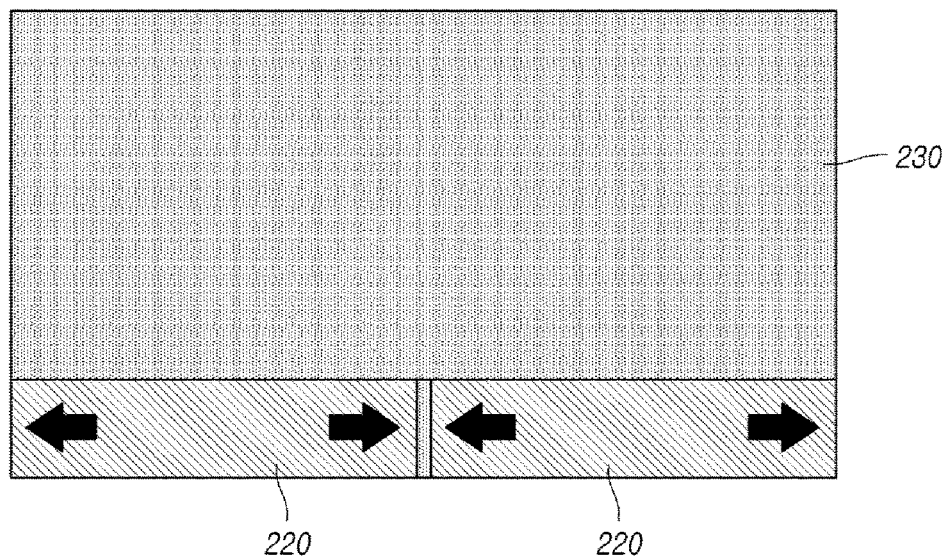
FIGS. 3 and 4 are rear views illustrating examples of the rear surfaces of a cover bottom and an LED housing in the display device of FIG. 2.

As illustrated by example in FIG. 3, the LED housing 220 may be divided at the center in the longitudinal direction of the cover bottom 230. By being divided at the center, the expansion of the LED housing 220 cancels itself out in the divided portion with reference to the center, and the expansion amounts on both sides of the center become equal to each other, so that the deformation of the cover bottom 230 due to thermal expansion of the LED housing 220 can be uniformly maintained in the entire region.

Figure 4:
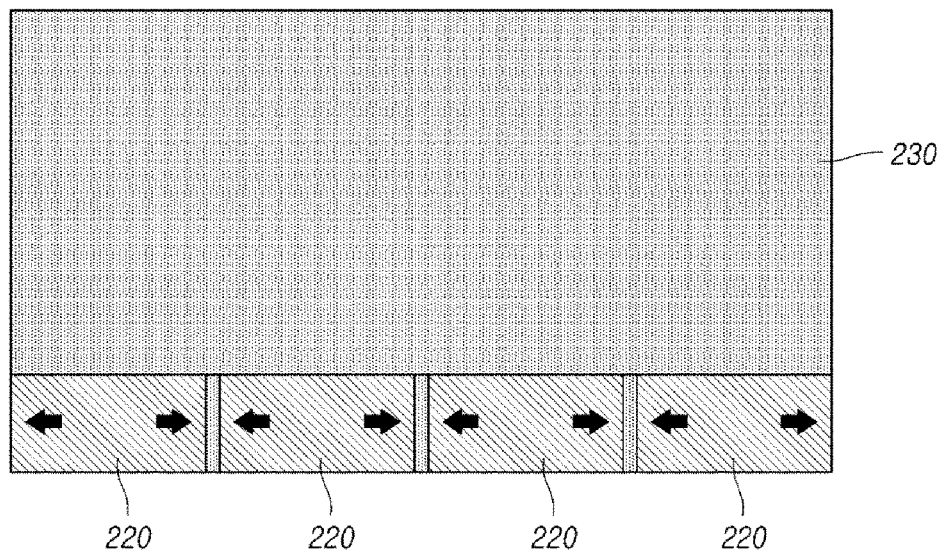

As illustrated by example in FIG. 4, the LED housing 220 can be further divided into equivalent lengths at the opposite sides with respect to the longitudinal center of the cover bottom 230. When the cover bottom 230 is divided into the equivalent lengths at the opposite sides with reference to the center, the longitudinal expansion amount of each of the separated LED housing portions 220 becomes constant, and the expansion amount may be further reduced compared with the case where the LED housing 220 is divided into two LED housing portions.

That is, when heat is uniformly transferred to the entire region of the LED housing 220, the thermal expansion deflection of the LED housing 220 is uniform. However, when heat is transferred to a local region, the thermal expansion deflection of the LED housing 220 is locally generated.

Therefore, even when uniform stress is generated at the opposite ends and the central portion of the cover bottom 230, thereby causing local thermal expansion stress of the LED housing 220, local breakage due to large deformation force does not locally occur in the cover bottom 230.

This effect can be confirmed through a test result. As the result of a test that was performed on a 55-inch type display device, when the temperature in the integrated LED housing 220 was 70° C., the longitudinal expansion amount at one end reached 0.65 mm. However, when the LED housing 220 is divided into two LED housing portions with reference to the center, the longitudinal expansion amount is reduced to about 0.33 mm, i.e. by about 50% or more, under the same temperature and size conditions.

With reference to the cover bottom 230, the expansion amount in the longitudinal direction is only 0.09 mm in the test under the same temperature and size conditions. Thus, the difference in expansion (between housing 220 and cover bottom 230) in the case in which the LED housing 220 is an integral LED housing is 0.56 mm. Furthermore, the difference in the expansion (between housing 220 and cover bottom 230) in the case in which the LED housing 220 is divided into two LED housing portions is 0.24 mm, so that the difference in expansion amount is reduced by about 50% or more.

When the difference in expansion amount between the LED housing 220 and the cover bottom 230 is reduced, the deformation force applied to the cover bottom 230 is also reduced, thereby preventing deformation and breakage of the cover bottom 230.

The relative magnitude of the thermal expansion force or thermal expansion amount is indicated by the size of the arrows in FIGS. 3 and 4. As illustrated in FIGS. 3 and 4, compared with the case in which the LED housing 220 is an integral LED housing, the magnitude of the thermal expansion force or the thermal expansion amount is significantly reduced in the case in which the LED housing 220 is divided into two or more LED housing portions at opposite sides with reference to the center.

Meanwhile, a middle cabinet 240 may be provided, in which a display panel 200 is seated on the front surface of the middle cabinet 240. The middle cabinet 240 is disposed on one end side surface of the light guide plate 203 and the cover bottom 230.

The middle cabinet 240 may maintain the coupling and rigidity from the display panel 200 to the cover bottom 230, maybe protect the cover bottom 230 made of a glass material, and may prevent water or foreign matter from infiltrating into the inside from the outside.

Figure 5:
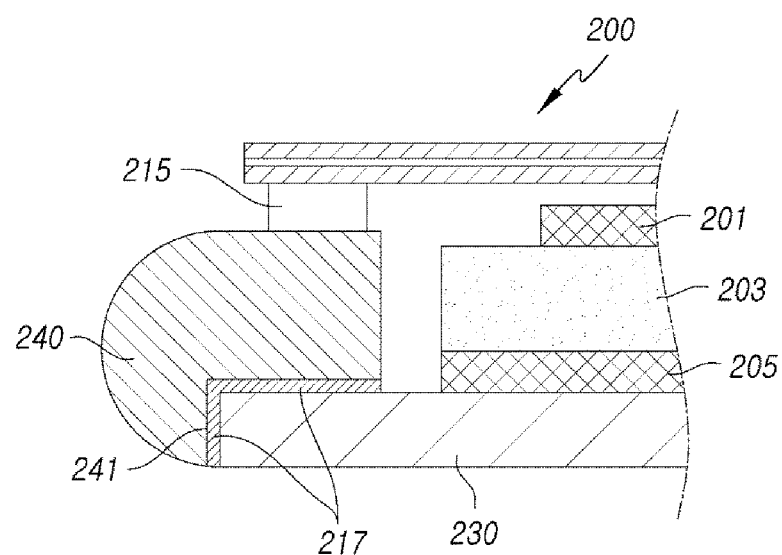
FIGS. 5 to 7 are cross-sectional views each schematically illustrating an example display device according to the embodiments disclosed herein.
Figure 6:
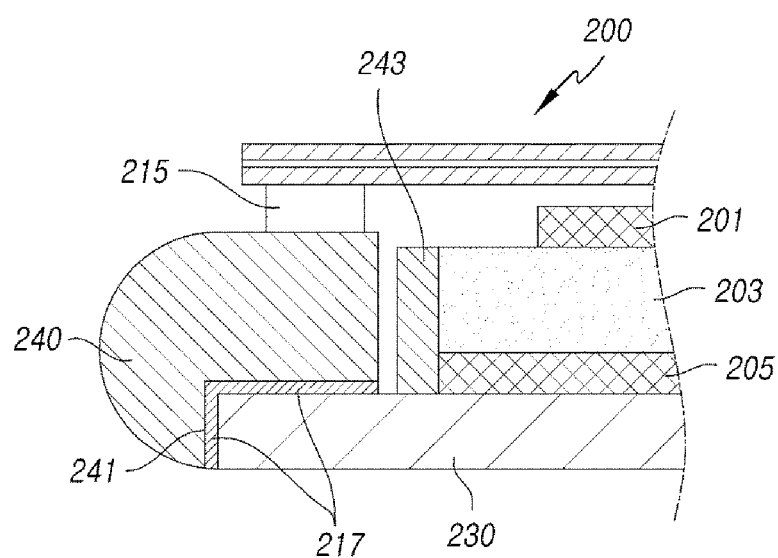
Figure 7:
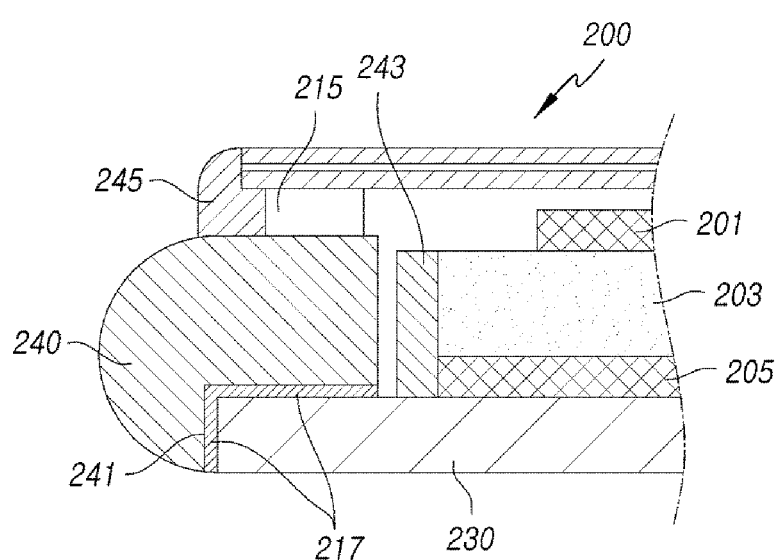

With reference to FIGS. 5-7, the middle cabinet 240 is coupled to the rear surface of the display panel 200 by an adhesive member 215 so that the display panel 200 can be prevented from deviating from a predetermined position and the size of the bezel can be minimized.

In consideration of moldability and material costs, the middle cabinet 240 may be formed of rubber, a synthetic resin such as urethane or plastic, or a metal material. However, in consideration of the appearance of the display device as well as a predetermined level of strength, the middle cabinet 240 may be made of aluminum, an aluminum alloy, stainless steel, galvanized steel sheet, or the like.

In addition, with reference to FIG. 7, a damping member 245 may be provided between the end of the display panel 200, the adhesive member 215, and the front surface of the middle cabinet 240 so as to absorb an impact.

Because the damping member 245 is provided, even if an impact is applied from the outside, it may be possible to prevent the breakage of the end portion of the display panel 200 and the infiltration of moisture and foreign matter from the outside.

As the damping member 245, a foam pad, urethane, or rubber that is provided with an adhesive layer on each of the opposite sides thereof, a double-sided tape, or the like may be used.

In addition, the inner surface of the middle cabinet 240 and the end portions of the light guide plate 203, which face each other, may be disposed at positions spaced apart from each other, and a damping member 243 may be provided therebetween.

The light guide plate 203 may be formed of a polymer resin, such as methacrylate styrene (MS), which is a light-transmissive material, so that light can be transmitted therethrough. Therefore, the inner surface of the middle cabinet 240 and the end portion of the light guide plate 203 are disposed so as to be spaced apart from each other in order to prevent bending, deformation, breakage, or the like from being caused by coming into contact with the middle cabinet 240 due to thermal expansion.

Also, even if the thermal expansion amount is equal to or larger than a predetermined level, the damping member 243 is elastically deformed to absorb the longitudinal expansion amount of the light guide plate 203, thereby preventing bending, deformation, breakage, or the like of the light guide plate 203.

Meanwhile, as shown in FIGS. 5-7, a seating groove 241 in which the end portion of the cover bottom 230 is seated may be provided on the rear surface and the side surface of the middle cabinet 240.

When the end of the cover bottom 230 is inserted into the middle cabinet 240 and seated in the seating groove 241, the thickness from the display panel 200 to the cover bottom 230 can be reduced, the bottom 230, which is made of a glass material, can be protected, and the size of the bezel can be minimized.

In addition, a light-shielding adhesive member 217 may be provided between the seating groove 241 of the middle cabinet 240 and the end of the cover bottom 230 to prevent light leakage to the outside, so that it is possible to prevent a so-called light leakage phenomenon in which light directed toward the end portion of the display panel 200 leaks out from a gap between the cover bottom 230 and the middle cabinet 240.

Here, the light-shielding adhesive member 217 may be bonded between the seating groove 241 of the middle cabinet 240 and the end portion of the cover bottom 230, for example, by printing a material to which, for example, a black pigment is added and being bonded thereto, or by being bonded with a sticky black tape. The light-shielding adhesive member 217 blocks the light emitted from the end portion of the display panel 200, thereby preventing the light leakage phenomenon and making the internal structure not visible from the outside.

As described above, according to the example embodiments, the thickness of the display device and the size of a bezel of the display device may be reduced as compared with a conventional cover bottom made of a metal or a plastic resin, thereby increasing consumer satisfaction with respect to the appearance of the display device, thereby increasing the marketability of the display device, and also enhancing the screen immersion level.

In addition, according to the example embodiments, it may be possible to prevent a display device from being warped or broken by thermal expansion due to heat generated in a backlight unit or the like in the display device.

Even though all of the components of an example embodiment of the present disclosure may be coupled as a single unit or coupled to be operated as a single unit, the present disclosure is not limited to such an example embodiment. That is, at least two elements of all structural elements may be selectively joined and operate without departing from the scope of the present disclosure.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
a display panel;
a light guide plate on a rear side of the display panel;
a reflector on a rear surface of the light guide plate;

a cover bottom on a rear surface of the reflector, wherein the cover bottom is made of a glass material;

a light-emitting diode (LED) housing including an LED on one end thereof to supply light to an end of the light guide plate, another end of the LED housing being coupled to a rear surface of an end of the cover bottom; and a source printed circuit board (PCB) on the rear surface of the LED housing, wherein the source PCB is connected to the display panel through a plurality of flexible circuit films.

2. The display device of claim 1, wherein the cover bottom and the LED housing are coupled to each other with an adhesive.

3. The display device of claim 2, wherein the LED housing is divided into two or more portions in a longitudinal direction from one end to another end of the cover bottom, and is coupled to a rear surface of the cover bottom.

4. The display device of claim 1, wherein the LED housing is divided at least at a center in the longitudinal direction of the cover bottom.

5. The display device of claim 4, wherein the LED housing is divided into equivalent lengths at opposite sides with reference to the center in the longitudinal direction of the cover bottom.

6. The display device of claim 1, further comprising:

a middle cabinet having a front surface on which the display panel is seated, the middle cabinet being disposed on one end side surface of the light guide plate and the cover bottom.

7. The display device of claim 6, wherein the middle cabinet is coupled to a rear surface of the display panel with an adhesive, and a damping member is provided between an end of the display panel, the adhesive, and the front surface of the middle cabinet to absorb an impact.

8. The display device of claim 7, wherein an inner surface of the middle cabinet and the end of the light guide plate, which face each other, are located at positions which are spaced apart from each other, and the damping member is provided therebetween.

9. The display device of claim 6, wherein the middle cabinet has a seating groove on a rear surface thereof and the end of the cover bottom is seated in the seating groove.

10. The display device of claim 9, further comprising:

a light-shielding adhesive between the seating groove and the end of the cover bottom to prevent light leakage to outside the display device.

11. The display device of claim 1, wherein the LED housing includes a plurality of LEDs on the one end thereof to supply light to the end of the light guide plate.

* * * * *